United States Patent
Loveland

(10) Patent No.: US 7,308,255 B2
(45) Date of Patent: Dec. 11, 2007

(54) EXTENDING MOBILE PHONE NETWORKS

(75) Inventor: Shawn D. Loveland, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 10/361,238

(22) Filed: Feb. 10, 2003

(65) Prior Publication Data
US 2004/0176077 A1  Sep. 9, 2004

(51) Int. Cl.
H04L 12/58 (2006.01)
(52) U.S. Cl. .............. 455/414.1; 455/445; 379/198
(58) Field of Classification Search ......... 455/403, 455/425, 426.1, 461, 463, 74.1, 414.1
See application file for complete search history.

(56) References Cited

U.S. PATENT DOCUMENTS

| | | | | |
|---|---|---|---|---|
| 5,933,774 | A * | 8/1999 | Bertocci | 455/417 |
| 6,058,178 | A * | 5/2000 | McKendry et al. | 379/211.01 |
| 6,115,604 | A * | 9/2000 | Lester et al. | 455/422.1 |
| 6,128,510 | A | 10/2000 | Beukema et al. | 455/557 |
| 6,151,500 | A * | 11/2000 | Cardina et al. | 455/435.2 |
| 6,704,580 | B1 * | 3/2004 | Fintel | 455/550.1 |
| 6,987,988 | B2 * | 1/2006 | Uchiyama | 455/557 |
| 7,120,454 | B1 * | 10/2006 | Frank et al. | 455/462 |
| 2002/0068529 | A1 * | 6/2002 | Knoble | 455/426 |
| 2003/0045306 | A1 * | 3/2003 | Himmel et al. | 455/461 |

FOREIGN PATENT DOCUMENTS

| | | |
|---|---|---|
| DE | 198 00 967 | 7/1999 |
| DE | 101 09 478 | 9/2002 |
| EP | 0 849 965 | 6/1998 |
| WO | WO 02/15542 | 2/2002 |

OTHER PUBLICATIONS

Moungnoul, Phichet; Sukkasem, Manoon; and Paungma, Twail; "*Personal Communication Telephone New System for Digital Wireless Communication in Thailand*," 1998 Asia Pacific Microwave Conference Proceedings, vol. 2, pp. 833-836.

(Continued)

Primary Examiner—Fan Tsang
Assistant Examiner—Simon Sing
(74) Attorney, Agent, or Firm—Perkins Coie LLP

(57) ABSTRACT

Methods, systems, and computer program products for bridging mobile phone networks with other telephone networks. A telephone network comprises multiple individually addressable telephone lines connected to telephones and to a gateway, which in turn is connected to one or more mobile phones and potentially to one or more landlines. When the gateway receives an inbound call from one of the mobile phones, or an outbound call from one or the telephones, the gateway applies routing rules to determine how to route the call. Routing may depend on a variety of factors, such as time of day, cost, the mobile phone receiving an inbound call. To help identify the mobile phone as the source of an inbound call, a distinctive ring may be selected. To account for differences in the mobile phone network and the telephone network, the gateway translates signals between the two networks.

20 Claims, 5 Drawing Sheets

OTHER PUBLICATIONS

Rotchel, Andre; "Wireless Office Trial System: an Experimental Indoor Cellular Systsem Providing Wireless Office Communication Services with a PBX Compatible System Architecture," XII International Symposium on Services and Local Access, pp. 39-45.

Lin, Yi-Bing; *"The Wireless Local Loop,"* IEEE Potentials, vol. 6, No. 3, pp. 8-10.

Harvill, Matt and Schroader, Kim; *"MTSO Testing: Where Wireless Becomes Wired,"* Telephony, vol. 229, No. 20, pp. 28, 32, and 34.

Suzuki, Toshiro; Yamamoto, Toshiaki; Kusaba, Akira; and Ogawa, Yoichi; *"Personal Handyphone System,"* Hitachi Review, vol. 44, No. 4, pp. 241-246.

Kass, Leon Paul; *"Make Way for a New Player,"* Telephone Engineer and Management, vol. 95, No. 15, pp. 39-41.

*"Cellsocket,"* <http://www.cellsocket.com/welcome.html>, visited Feb. 10, 2003.

*"Cellsocket,"* <http://www.cellsocket.com/features.html>, visited Feb. 10, 2003.

*"Cellsocket,"* <http://www.cellsocket.com/faq.html>, visited Feb. 10, 2003.

*"Plant Your Wandering Cell Phone in Vox2's Vox.Link,"* <http://www.cconvergence.com/article/TCM200001204S0001>, visited Feb. 10, 2003.

*"vox2,"* <http://www.mylinkline.com/vox2.htm>, visited Feb. 10, 2003.

*"v2_benefits,"* <http://www.mylinkline.com/v2_benefits.htm>, visited Feb. 10, 2003.

*"v2_faqs,"* <http://www.mylinkline.com/v2_faqs.htm>, visited Feb. 10, 2003.

European Search Report, Microsoft Corporation, Feb. 16, 2006.

\* cited by examiner

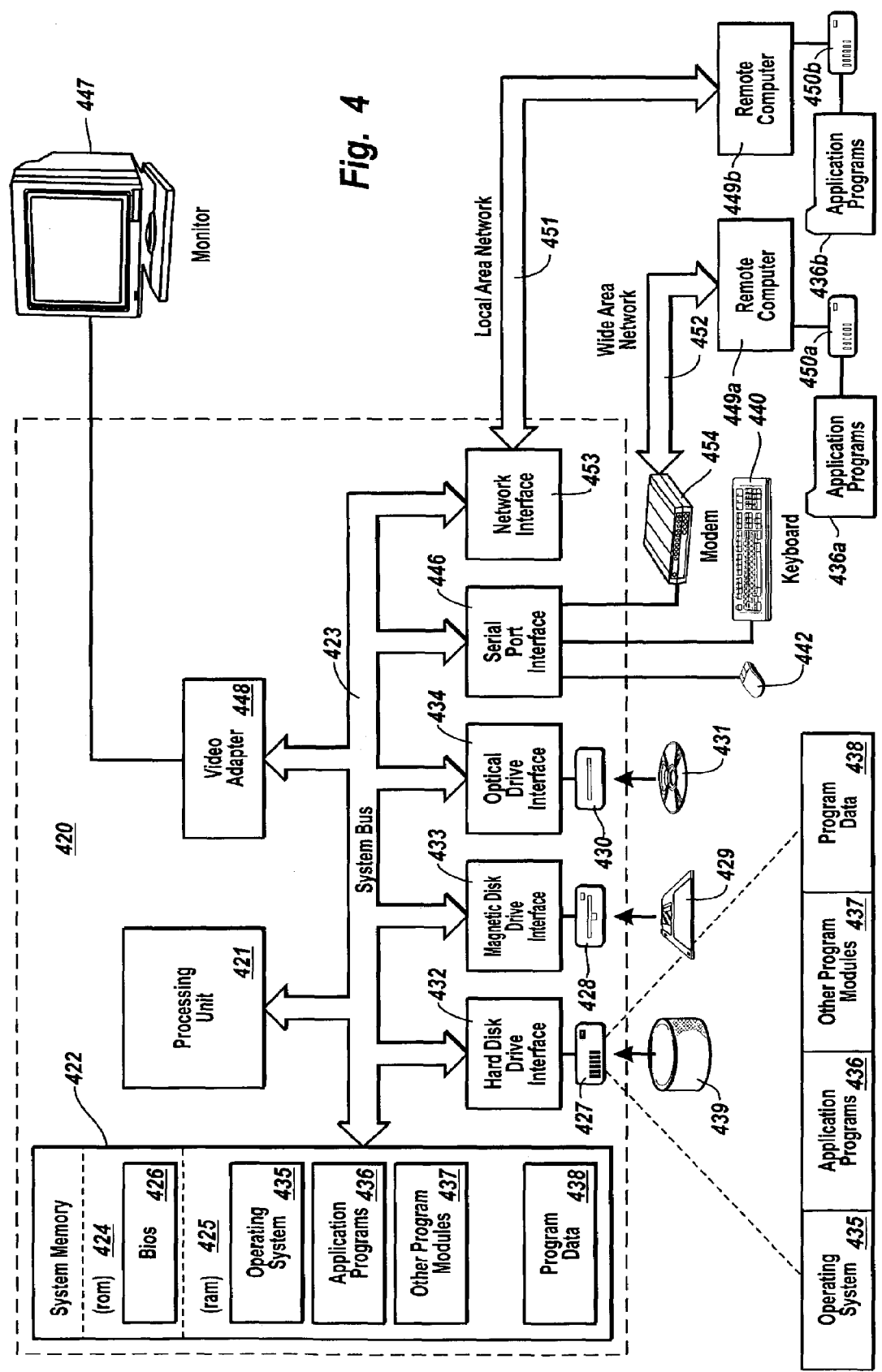

EXTENDING MOBILE PHONE NETWORKS

CROSS-REFERENCE TO RELATED APPLICATIONS

N/A

BACKGROUND OF THE INVENTION

1. The Field of the Invention

The present invention relates to mobile phone networks. More particularly, the present invention relates to methods, systems, and computer program products for bridging mobile phone networks with other telephone networks.

2. Background and Related Art

Cellular phones are becoming increasing popular. Initially, size, cost, and geographic coverage limited most cellular phone use to a business context. Early cellular phones frequently were referred to as "bricks," due to their bulk and inconvenience. Professionals and technicians with on-call responsibilities were the typical cellular phone user. In many circumstances, numeric and text pagers provided an economical and convenient alternative to early cellular phones.

Today's cellular phones are compact enough to fit in a user's pocket, have, purchase and monthly service costs similar to traditional telephones, and offer local, regional, and national coverage. Often, a single household will have multiple cellular phones. With the increasing popularity of cellular phones, some are beginning to realize that a separate home or office phone may not be necessary. Over the next five years, it is estimated that up to 30% of landlines in homes will be disconnected and users will depend solely on cellular phone service.

As consumers begin to make the transition from home or office landlines to exclusive (or principle) cellular use, they are likely to encounter some loss of convenience. For example, a cellular phone can only be located in a single place at once. In particular, user's often charge their cellular phone in the evening so they will be ready for use the next day. Accordingly, users generally do not or cannot carry their cellular phone around with them while at home in the evening. Of course, even if a user elects to carry the cellular phone around while awake, the phone may be inadvertently left in one room when the user moves to another room, making it difficult to locate the cellular phone when it rings. Where multiple users share a cellular phone, these difficulties are likely to be more pronounced.

In addition to the foregoing problems, other customer satisfaction issues are likely to arise as well, including the perceived health concerns about cellular phone radiation. This health concern may be particularly manifested where users are faced with extended exposure. Naturally, limited battery life for talk and standby time also will present barriers to increased cellular phone use. Furthermore, the benefit of automated addressing for emergency 911 response usually is tied to a landline. On the other hand, eliminating the cost of a landline and the convenience of a single telephone number are attractive objectives.

In an effort to address some of the shortcomings associated with increased cellular telephone usage, some have proposed products that are essentially a cellular phone charger with a telephone jack. By attaching a cordless or other telephone to the jack in the charger, a traditional telephone may be used for placing and receiving calls through the cellular phone. While providing some benefits, these simple products lack many features that consumers will find useful. For example, consumers may want to route incoming calls to particular telephones within a house or office. This feature may be of particular value where multiple cellular telephones are available for use.

Similarly, consumers also may wish to automatically route outgoing calls to any of multiple cellular telephones or to either a cellular phone or a landlines depending on the circumstances surrounding the outgoing calls. As a further convenience, consumers may desire call routing for incoming and outgoing calls to vary over the course of a day. Support for a variety of telephone types may help address certain needs in business or relatively sophisticated home installations. Furthermore, rudimentary charger products fail to expose the rich call feature sets available in most cellular networks. Due at least in part to the simplicity of these products, they offer no facility for receiving configuration information, such as from a personal computer. Accordingly, methods, systems, and computer program products are desired for bridging mobile phone networks with other telephone networks.

BRIEF SUMMARY OF THE INVENTION

It should be appreciated that this summary is intended only to provide a brief overview of the invention and should not be interpreted as limiting its scope, which is defined by the claims. The present invention extends to methods, systems, and computer program products for bridging mobile phone networks with other telephone networks. For example, a telephone network may comprise multiple individually addressable telephone lines connected to one or more telephones. The individually addressable telephone lines are connected to a gateway, which in turn is connected to one or more mobile phones. The gateway also may be connected to one or more landlines.

When the gateway receives an inbound call from one of the mobile phones, the gateway applies one or more routing rules to determine one or more of the individually addressable telephone lines through which the inbound call should be connected. Once identified, the gateway connects the inbound call to the one or more individually addressable telephone lines, allowing the telephones connected to the individually addressable telephone lines to be used for the call inbound from the mobile phone. To help identify the mobile phone as the source of the inbound call, a distinctive ring option may be selected.

Similarly, when the gateway receives an outbound call from a telephone connected to the gateway through one of the individually addressable telephone lines, the gateway applies one or more routing rules to select a mobile phone or landline through which the outbound call should be routed. Having selected a mobile phone or landline, the gateway connects the outbound call appropriately.

Routing may depend on a variety of factors, such as time of day, cost, the mobile phone receiving an inbound call, etc. Telephones may be any or a combination of analog telephones, integrated service digital network telephones, digital telephones, Internet protocol telephones, and the like. Due to differences in the mobile phone network and the telephone network, the gateway translates signals between the two networks. This translation allows for the generation of appropriate ring voltages and dial tones, as well as features like call waiting, message notifications, caller ID, caller waiting ID, call forwarding, phone forwarding, conference calls, transferring calls, and so forth, which may be available at the mobile phone network, but not at the telephone network at all, or not at the telephone network with the same interaction as would occur directly with the mobile phone network.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

The present invention extends to methods, systems, and computer program products for bridging a mobile phone network and another telephone network. The embodiments of the present invention may comprise one or more special purpose and/or one or more general purpose computers including various computer hardware, as discussed in greater detail below.

Figure 1:
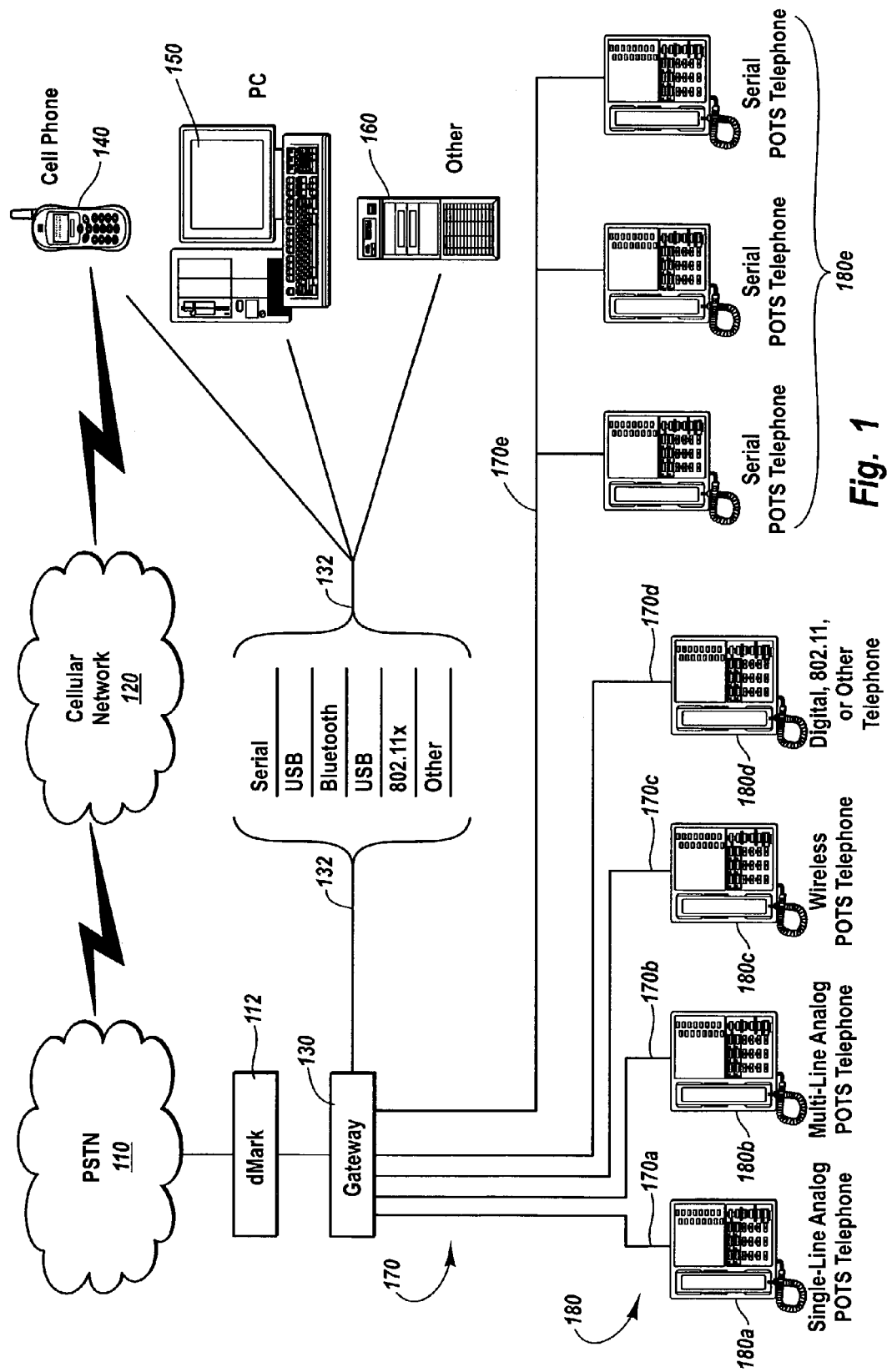
FIG. 1 illustrates an example environment for practicing the present invention.

FIG. 1 illustrates an example environment for practicing the present invention, where gateway 130 operates as a bridge between cellular network 120 and a telephone network with multiple individually addressable telephone lines 170 connected to telephones 180. Cellular network 120 may be any type of cellular network, including, for example, a GSM network, a TDMA network, or a CDMA network. GSM or global system for mobile communication is a digital mobile telephone system used widely in Europe and other areas. GSM is the most widely used of these three technologies and is a variation of TDMA. TDMA or time division multiple access divides each cellular channel into three time slots. CDMA or code-division multiple access uses a spread spectrum technology and generally refers to any of various protocols. Both TDMA and CDMA are common in the United States.

For gateway 130 the connection to cellular network 120 includes a connection to cellular phone 140 through connection 132 and a wireless connection from cellular phone 140 to the cellular network 120. It should be noted that cellular phone 140 is one type of mobile phone. As used in this specification, the term "mobile phone" refers to wireless phones that connect directly with a third-party wireless service provider, in contrast to, for example, cordless phones, which connect directly to a consumer base station. Accordingly, "mobile phone" includes cellular phones, satellite phones, etc.

Connection 132 between cellular phone 140 and gateway 130 may comprise a serial connection, a universal serial bus ("USB") connection, a Bluetooth connection, an 802.11x connection, or some other type of connection, including other wired and wireless connections. 802.11 is a family of specifications related to wireless local area network ("LAN") technology. Specifically, 802.11 specifies a wireless interface between a wireless client and a base station or between two wireless clients. Similarly, Bluetooth defines a short-range wireless connection specification for mobile phones, computers, and personal digital assistants ("PDAs"). It is appropriate to point out here, that the term "connection" should be interpreted broadly to encompass any type of link that allows for the transfer of information.

As indicated above various telephones 180 are also connected to gateway 130 through individually addressable telephone lines 170. For example, single-line analog POTS telephone 180a is connected to gateway 130 through wired line 170a; multi-line analog POTS telephone 180b is connected to gateway 130 through one or more wired lines 170b; wireless POTS telephone 180c is connected to gateway 130 through wireless line 170c; digital, 802.11, or other telephone 180d is connected to gateway through line 170d; and serial POTS telephones 180e are connected to gateway 130 through a common line 170e. Similar to connection, the term "line" should be interpreted broadly to encompass any link capable of transferring data, whether wireless or wired. In some implementations, a single line may be multiplexed for multiple phones, using, for example, some form of frequency-based or time-based multiplexing. It should be noted that line 170e represent an individually addressable telephone line even though three serial (i.e., daisy-chained) telephones are connected to it.

FIG. 1 shows mostly POTS telephones. POTS is short for plain old telephone service and refers to the standard telephone service that most homes in the United States use. POTS may be contrasted with high-speed digital communication lines, like ISDN and FDDI, which offer greater bandwidth and speed. Often, POTS is used interchangeably with PSTN, or public switched telephone network.

Of course, telephones 180 can be any type of telephones, including analog telephones, digital telephones, ISDN telephones, wireless telephones, Internet protocol telephones, session initiation protocol ("SIP") telephones, etc. SIP telephones allow for various services, such as instant messaging ("IM"), short message service ("SMS"), multimedia message service ("MMS"), and the like.

PSTN 110 is connected to gateway 130 through dMark 112 and includes one or more landlines. (Although many portions of PSTN 110 may be digital, historically the final link between a home and the central or local telephone office ("CO") is analog.) Personal computer 150 and other computer 160 are also connected to gateway 130 through line or connection 132, and may be used as phones and/or for configuring gateway 130.

To help appreciate the benefits of gateway 130, consider the following scenario. A family that includes a father, a mother, and a son lives in a single family house with standard POTS phones in most rooms. Because each of them has their own cellular phone, they have decided to cancel their POTS phone service. Prior to canceling their POTS phone service, when the family members arrived home they placed their cellular phones in chargers to prepare the phone for use the next day. This is inconvenient now because people call their cellular phones rather than their home phones. With, their cellular phones in the chargers, the family found that they missed calls because the chargers were frequently in another room away from at least some of the family members. However, by keeping their phones with them, the family members occasionally forgot to put their phone in the charger and would not have enough of a charge for the next day.

Installing gateway 130 solved many of the problems the family experienced, without having to reactivate the POTS line. (Although, it should be pointed out that in some embodiments of the invention, one or more POTS lines are available to the gateway.) A splitter plugged into the house's dMark 112 isolates the house from the PSTN 110 and allows the gateway to address various phone lines (170a-170e) individually. (Among other things, isolation is important because gateway 130 will generate ring voltages.) For configuration, gateway 130 may be connected to a USB port on PC 150.

The family's cellular phones (like cellular phone 140) are connected to chargers that are connected to the gateway through connection 132. Note that the chargers may be incorporated into the gateway 130, may be separate but connected to gateway 130, etc. When configuration begins, PC 150 shows the three cellular telephones and their corresponding numbers. (An example embodiment for PC 150 is described in greater detail below with respect to FIG. 4.) The configuration software then discovers each of the available phones in the house by trying each of the telephone lines 170a-170e. As each telephone rings, a descriptive name may be entered to help better identify the phone through the remainder of the configuration process. (Descriptive names also may be given to each cellular phone.)

Continuing on with more advanced configuration; options, various of the telephone lines (and corresponding telephones) are selected for routing inbound calls on each of the cellular phones. For example, one or more routing rules may route inbound calls to the son's cellular telephone to only the kitchen, the TV room, and the son's bedroom. Routing rules also may include a time-of-day component. For example, to establish quiet time, calls inbound to the son's cellular telephone may be routed to an answering machine (including a voice messaging system) during late evening and early morning hours. These routing rules also may restrict outbound calls. During configuration, unique rings may be assigned to everyone's cellular phone to help identify the source of an inbound call. When the configuration is complete, the configuration information is downloaded to the gateway 130 from PC 150 so that the gateway does not need the PC to function correctly.

Sometime after the gateway 130 has been configured, the father returns home and places his cellular phone into a charger. Later, the correct phones ring in the house as determined by the routing rules for the father. The phones ring with a ring tone indicating that the father's cellular phone is the source of the call. The father answers the call with the nearest POTS phone, just as when the family had POTS service. During the call, he conferences his wife into the call. Again, like when the family had POTS service, the father does a flash hook, dials the number for his wife, and does another flash hook to connect the conference call. This is possible because the gateway maps the POTS telephone network signals to their cellular equivalent.

While his parents are on their call, the son determines he would like to call a friend. He plugs his phone into the charger and goes to his room to make the call. He picks up his telephone and makes the call just like he did when he had a POTS line, except, whereas before the family had only one POTS line and only one person could make a call at a time, the gateway routes the son's call from his room to his cellular telephone. This is possible because the gateway's routing rules associate the telephone in the son's room with his cellular telephone.

Figure 2:
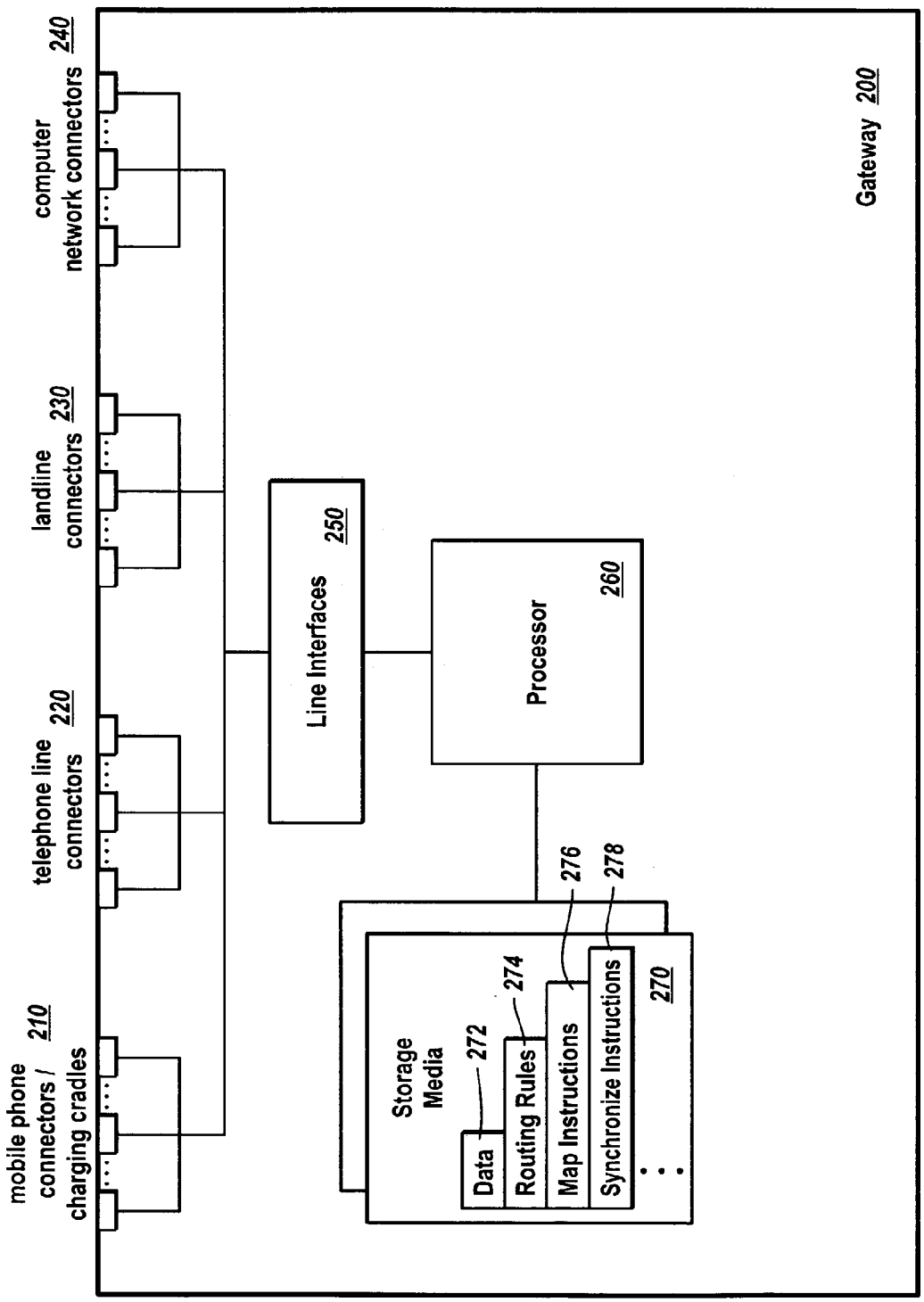
FIG. 2 shows an example embodiment of the present invention.

FIG. 2 shows some additional details for an example gateway 200 in accordance with the present invention. Gateway 200 includes one or more mobile phone connectors/charging cradles 210, one or more telephone connectors 220, one or more landline connections 230, and one or more computer network connectors 240. It should be noted that each of these connectors should be interpreted broadly to encompass any structure suitable for linking gateway 200 to a mobile telephone, a telephone line, a landline, and/or a computer network.

Within gateway 200, each of these connectors is connected to one or more line interfaces 250, which may be included within the connectors, within the processor 260, or as a separate component as shown in FIG. 2. One or more storage media 270 store data 272, routing rules 274, map instructions 276, synchronize instructions 278, etc. (Note that as described with respect to FIG. 4, storage media may take any of a variety of forms, including solid state devices for enhanced reliability.) Synchronize instructions 278 are for synchronizing data 272 with a version of the data stored on a connected mobile telephone. For example, data 272 might include a telephone directly, a call log, etc. The processor 260 executes the routing rules 274, synchronize instructions 278, map instructions 276, and other instructions, to direct the operation of the gateway.

Map instructions 276 are used to map mobile phone network signals to the telephone network equivalent, and vice-versa. This allows gateway 200 to expose the rich functionality offered by most cellular phone networks to the telephone network. These signals may include a call waiting signal, an abandoned call signal, a hold signal, a message notification signal, a caller ID signal, a caller waiting ID signal, a call forward signal, a phone forward signal, a conference call signal, a transfer call signal, a ring voltage signal, a dial tone signal, a signal for indicating received messages, etc. The gateway 200 may include various other computer hardware and software as discussed in greater detail below with respect to FIG. 4.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 3A:
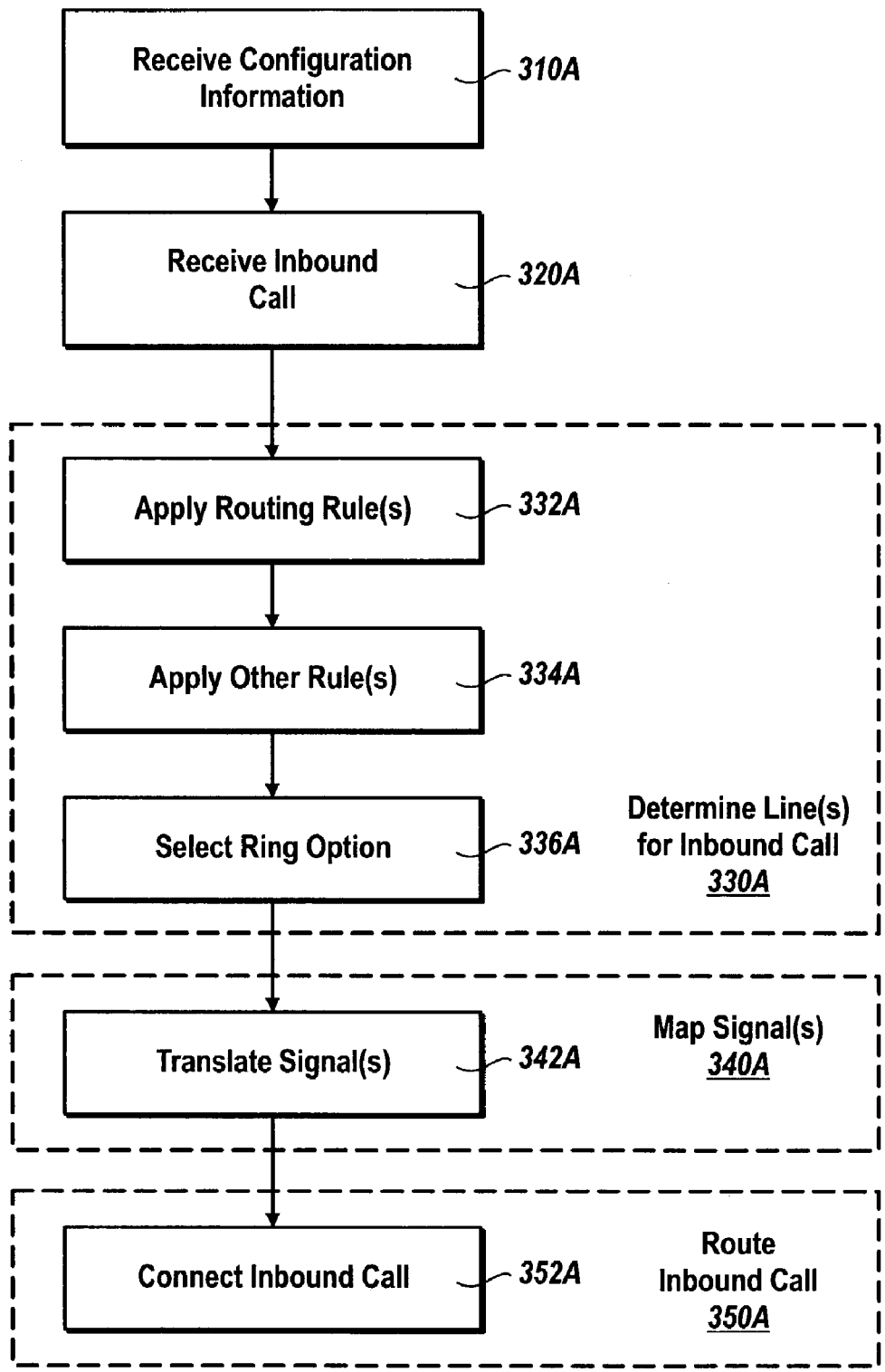
FIGS. 3A-3B show example acts and steps for methods of routing calls in accordance with the present invention.
Figure 3B:
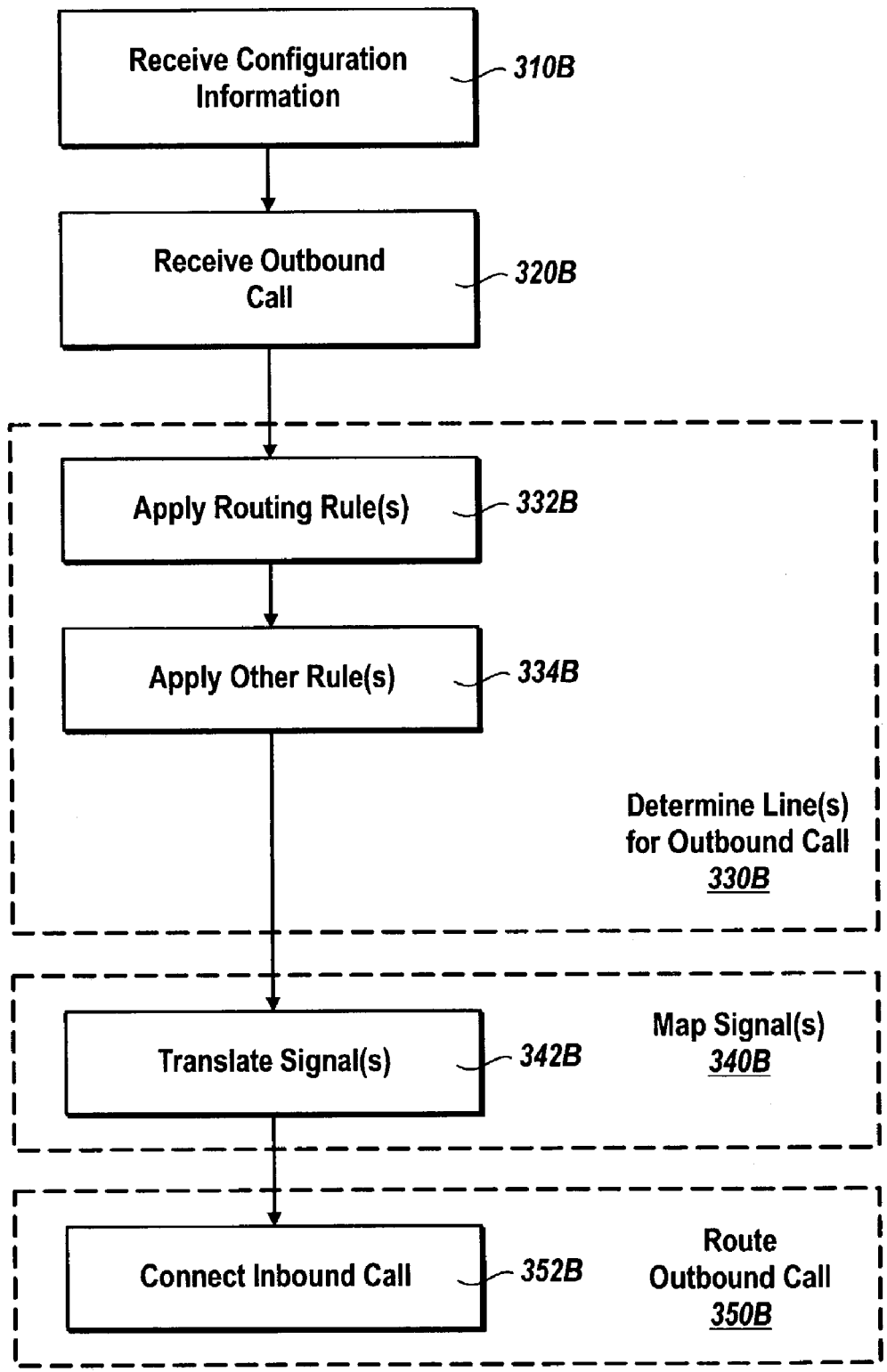

Specifically, FIGS. 3A-3B show example acts and steps for methods of routing calls in accordance with the present invention. For inbound calls (FIG. 3A), a gateway may perform an act of receiving (310A) configuration information, such as from a PC. This configuration information may include routing rules ring options, other rules, etc. The gateway receives (320A) an inbound call. A step for determining (330A) which of one or more line(s) of the individually addressable telephone lines connected to the gateway should be used for routing an inbound call may include acts of applying (332A) one or more routing rules to the inbound call, an act of applying (334A) one or more other rules that control operation of the gateway, and selecting (336A) one of one or more available ring options to identify the mobile phone that is the source of the inbound call.

A step for mapping (340A) one or more mobile phone network signals to one or more corresponding telephone network signal and mapping one or more telephone network signals to one or more corresponding mobile phone network signals may include an act of translating (342A) between the one or more mobile phone network signals and the one or more telephone network signals. A step for routing (350A) an inbound call to the one or more of the individually addressable telephone lines that the gateway determined should be used for routing the inbound call may include an act of connecting (352A) the inbound call to the one or more of the individually addressable telephone lines identify by the routing rules.

For outbound calls (FIG. 3B) a gateway may perform an act of receiving (310B) configuration information from a PC. It should be noted that showing this act in both FIGS. 3A (310A) and 3B (310B), does not necessarily require separate receiving acts for inbound and outbound calls. This configuration information may include routing and other rules. The gateway receives (320B) an outbound call. A step for determining (330B) which of one or more mobile phones and one or more landlines should be selected to carry the outbound call may include acts of applying (332B) one or more routing rules to the outbound call and an act of applying (334B) one or more other rules that control operation of the gateway.

A step for mapping (340B) one or more mobile phone network signals to one or more corresponding telephone network signal and mapping one or more telephone network signals to one or more corresponding mobile phone network signals may include an act of translating (342B) between the one or more mobile phone network signals and the one or more telephone network signals. A step for routing (350B) an inbound call to one of the one or more mobile phone and one or more landlines may include an act of connecting (352B) the outbound call to the one or more of the selected one of the one or more mobile phones and one or more landlines.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an example system for implementing the invention includes a general purpose computing device in the form of a computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

Although not shown in FIG. 4, the various connectors and interfaces shown in FIG. 2 may be present where the computer shown in FIG. 4 is used as a gateway. It should be noted that the relatively complexity of a gateway may depend on whether configuration will occur through an external computer or if the gateway is completely self-sufficient, as well as other factors. Furthermore, FIG. 4 represents only an example of one possible embodiment for a gateway according to the present invention or a computer used to configure the gateway. Accordingly, much of the hardware and software described with respect to FIG. 4 is optional and is likely to vary from one implementation to another.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input-devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. Of course, a gateway may not require any type of display or may include a display integrated within the gateway itself, such as a relatively small liquid crystal display. In addition to the monitor, computer 420 may include other peripheral output devices (not shown), such as speakers and printers.

The computer 420 may operate in a networked environment using logical connections to one or more remote computers, such as remote computers 449a and 449b. Remote computers 449a and 449b may each be a personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area-network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a gateway for a telephone network that comprises multiple individually addressable telephone lines and at least one telephone connected to at least one of the individually addressable telephone lines, a method of routing one or more calls, inbound to one or more mobile phones connected to the gateway, to any of the individually addressable telephone lines such that any of the individually addressable telephone lines can be used to receive the one or more calls inbound to the one or more mobile phones, the method comprising acts of:

the gateway receiving an inbound call addressed to a mobile phone connected to the gateway, the inbound call being received by the gateway through the connected mobile phone;

the gateway applying one or more routing rules to the inbound call for identifying one or more of the individually addressable telephone lines through which the inbound call should be routed; and connecting the inbound call to the one or more of the individually addressable telephone lines identified by the routing rules.

2. A method as recited in claim 1, further comprising an act of the gateway selecting one of one or more available ring options to identify the mobile phone as the addressee of the inbound call.

3. A method as recited in claim 1, wherein multiple mobile phones are connected to the gateway and at least one of the one or more rules comprises a component that is specific to a particular mobile phone.

4. A method as recited in claim 1, wherein at least one of the one or more routing rules comprises a time-of-day component for routing inbound calls.

5. A method as recited in claim 4, wherein the at least one routing rule that comprises a time-of-day component causes the inbound call to be routed to an individually addressable telephone line connected to an answering machine.

6. A method as recited in claim 1, wherein a telephone connected to the one or more of the individually addressable telephone lines identified by the routing rules comprises either a single-line analog telephone, a multi-line analog telephone, an integrated services digital network telephone, a digital telephone, or an Internet protocol telephone.

7. A method as recited in claim 1, wherein one or more signals for interacting with a mobile phone network corresponding to the mobile phone differ from one or more signals for interacting with the telephone network through a telephone connected to at least one of the individually addressable telephone lines, the method further comprising an act of the gateway translating between the one or more mobile phone network signals and the one or more telephone network signals.

8. A method as recited in claim 7, wherein the one or more telephone network signals comprise a ring voltage signal.

9. A method as recited in claim 7, wherein the one or more mobile phone network signals comprise at least one of (i) a call waiting signal, (ii) an abandoned call signal, (iii) a hold signal, (iv) a message notification signal, (v) a caller ID signal, (vi) a caller waiting ID signal, (vii) a call forward signal, (viii) a phone forward signal, (ix) a conference call signal, and (x) a transfer call signal.

10. A method as recited in claim 1, wherein a computer is connected to the gateway, the method further comprising an act of receiving configuration information for the gateway from the computer.

11. For a gateway connected to a telephone network that comprises multiple individually addressable telephone lines and at least one telephone connected to at least one of the individually addressable telephone lines, a computer program product comprising one or more computer readable media carrying computer executable instructions that implement a method of routing one or more calls, inbound to one or more mobile phones connected to the gateway, to any of the individually addressable telephone lines such that any of the individually addressable telephone lines can be used to receive the one or more calls inbound to the one or more mobile phones, the method comprising acts of:

the gateway receiving an inbound call addressed to a mobile phone connected to the gateway, the inbound call being received by the gateway through the connected mobile phone;

the gateway applying one or more routing rules to the inbound call for identifying one or more of the individually addressable telephone lines through which the inbound call should be routed; and connecting the inbound call to the one or more of the individually addressable telephone lines identified by the routing rules.

12. A computer program product as recited in claim 11, the method further comprising an act of the gateway selecting one of one or more available ring options to identify the mobile phone as the addressee of the inbound call.

13. A computer program product as recited in claim 11, wherein multiple mobile phones are connected to the gateway and at least one of the one or more rules comprises a component that is specific to a particular mobile phone.

14. A computer program product as recited in claim 11, wherein at least one of the one or more rules comprises a time-of-day component for routing inbound calls.

15. A computer program product as recited in claim 14, wherein the at least one rule that comprises a time-of-day component causes the inbound call to be routed to an individually addressable telephone line connected to an answering machine.

16. A computer program product as recited in claim 11, wherein a telephone connected to the one or more of the individually addressable telephone lines identified by the routing rules comprises either a single-line analog telephone, a multi-line analog telephone, an integrated services digital network telephone, a wireless telephone, a digital telephone, or an Internet protocol telephone.

17. A computer program product as recited in claim 11, wherein one or more signals for interacting with a mobile phone network corresponding to the mobile phone differ from one or more signals for interacting with the telephone network through a telephone connected to at least one of the individually addressable telephone lines, the method further comprising an act of the gateway translating between the one or more mobile phone network signals and the one or more telephone network signals.

18. A computer program product as recited in claim 11, the method further comprising an act of applying one or more other rules that dictate operation of the gateway.

19. A gateway for bridging one or more mobile phone networks supporting one or more mobile phones and a telephone network that comprises multiple individually addressable telephone lines and at least one telephone connected to at least one of the individually addressable telephone lines, the gateway comprising:

one or more mobile phone connectors that connect one or more mobile phones to the gateway so that the gateway can receive and route inbound calls addressed to one or more mobile phones connected to the gateway, wherein each inbound call received by the gateway is received through one of the connected mobile phones;

one or more telephone line connectors that connect the plurality of individually addressable telephone lines and the at least one telephone to the gateway so that the gateway can receive and route the received inbound call through one or more of the individually addressable telephone lines;

one or more storage media containing one or more routing rules that are applied to the received inbound call to identify one or more of the individually addressable telephone lines through which the received inbound call should be routed; and a processor that executes the routing rules and causes the inbound call received through a mobile phone connected to the gateway to be routed according to the executed routing rules.

20. A gateway as recited in claim 19, further comprising one or more computer network connectors that connect the gateway to one or more computers.

* * * * *